(12) United States Patent
Tervo et al.

(10) Patent No.: US 9,664,309 B2
(45) Date of Patent: May 30, 2017

(54) INTEGRAL PUMP MOUNT AND HOSE ATTACHMENT FOR A VEHICLE

(71) Applicant: GM GLOBAL TECHNOLOGY OPERATIONS LLC, Detroit, MI (US)

(72) Inventors: Steven A. Tervo, Howell, MI (US); John M. Albert, Sterling Heights, MI (US); Keith W. Weishuhn, Waterford, MI (US); Mark W. Purdy, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 791 days.

(21) Appl. No.: 14/043,172

(22) Filed: Oct. 1, 2013

(65) Prior Publication Data

US 2015/0091294 A1    Apr. 2, 2015

(51) Int. Cl.
*F16L 55/035*    (2006.01)
*F16L 3/12*    (2006.01)

(52) U.S. Cl.
CPC ......... *F16L 3/1218* (2013.01); *F16L 55/035* (2013.01)

(58) Field of Classification Search
CPC . F16L 3/1218; F16L 3/003; F16L 3/10; F16L 55/0337; F16L 55/035
USPC .......... 285/62; 248/647, 638, 649, 650, 610
See application file for complete search history.

(56) References Cited

U.S. PATENT DOCUMENTS

| 2,226,505 | A | * | 12/1940 | Saurer | F16L 55/035 403/228 |
| 2,308,969 | A | * | 1/1943 | Riesing | F16L 3/16 248/613 |
| 2,699,961 | A | * | 1/1955 | Omon | F16L 55/1007 285/62 |
| 3,061,253 | A | * | 10/1962 | Keaton | F16L 55/035 248/74.1 |
| 3,999,784 | A | * | 12/1976 | Kennedy, Jr. | F16L 3/16 248/65 |
| 4,590,964 | A | * | 5/1986 | Beardmore | F02M 37/10 137/565.24 |
| 4,595,162 | A | * | 6/1986 | Matsumura | F16L 55/035 248/67.5 |

(Continued)

FOREIGN PATENT DOCUMENTS

| CN | 1337329 A | 2/2002 |
| CN | 202623909 U | 12/2012 |

(Continued)

*Primary Examiner* — David E Bochna
(74) *Attorney, Agent, or Firm* — Quinn IP Law

(57) ABSTRACT

An apparatus is provided that mounts both a pump and either an inlet hose or an outlet hose for the pump to vehicle support structure. The pump has a pump housing with a pump inlet and a pump outlet. An inlet hose is attached to the pump inlet, and an outlet hose is attached to the pump outlet. The apparatus includes a compliant pump hose mount that has a hose attachment portion with a hose opening sized so that one of the inlet hose and the outlet hose is supportable by the pump hose mount at the hose opening. The pump hose mount also has a mount portion mountable to the vehicle support structure. The pump is thereby mounted to the vehicle support structure by the pump hose mount so that noise and vibration of the pump are mitigated by the pump hose mount.

4 Claims, 3 Drawing Sheets

(56) References Cited

U.S. PATENT DOCUMENTS

| | | | | |
|---|---|---|---|---|
| 4,667,920 A * | 5/1987 | Kleineberg | ........... | F16F 1/3732 |
| | | | | 248/638 |
| 4,784,363 A * | 11/1988 | Brown | ................. | F16L 55/035 |
| | | | | 248/610 |
| 5,313,780 A * | 5/1994 | Williams | ................. | F16L 3/00 |
| | | | | 285/62 |
| 5,379,594 A * | 1/1995 | Quellhorst | ........... | F16L 55/035 |
| | | | | 248/638 |
| 5,490,470 A * | 2/1996 | House | ..................... | A01C 5/06 |
| | | | | 285/62 |
| 8,876,066 B1 * | 11/2014 | Richards | .............. | F16L 3/1016 |
| | | | | 248/55 |
| 2006/0226301 A1 * | 10/2006 | Kwilosz | ............... | F16L 55/035 |
| | | | | 248/65 |
| 2010/0243855 A1 * | 9/2010 | Sampson | ............ | F16L 55/035 |
| | | | | 248/534 |
| 2012/0217353 A1 * | 8/2012 | Hennon | ............... | F16L 55/035 |
| | | | | 248/67.5 |
| 2014/0284432 A1 * | 9/2014 | Shepard | ............... | F16L 55/035 |
| | | | | 248/74.2 |
| 2016/0116083 A1 * | 4/2016 | Olsen | ................... | F16L 3/1091 |
| | | | | 248/74.1 |

FOREIGN PATENT DOCUMENTS

| | | | | |
|---|---|---|---|---|
| DE | 3503572 A1 * | 8/1986 | ............. | F16L 3/006 |
| DE | 4032431 C1 * | 4/1992 | ............. | B60K 13/04 |
| JP | H10259724 A | 9/1998 | | |

* cited by examiner

INTEGRAL PUMP MOUNT AND HOSE ATTACHMENT FOR A VEHICLE

TECHNICAL FIELD

The present teachings generally include a mount for a vehicle pump, such as a coolant pump.

BACKGROUND

Vehicle pumps are a potential source of noise and vibration. Noise and vibration of a pump, such as an electric centrifugal coolant pump, is typically managed by use of a bracket assembly that attaches to the pump housing. The bracket assembly is sometimes annular and includes a compliant member positioned between the bracket and the pump housing. The bracket attaches to vehicle support structure such as a cooling fan radiator module, typically at two locations. The bracket and compliant member must be specifically designed to fit each pump model for each vehicle application in order to adequately mitigate noise and vibration from the pump through the bracket and compliant member. The number and location of connections between the pump system and the vehicle support structure increases the complexity of tuning the dynamic and static stiffness of each connection to mitigate noise and vibration transmission. Build tolerance stack-up of components, materials, temperature and time all affect noise and vibration.

SUMMARY

An apparatus is provided that mounts both a pump and an inlet or an outlet hose for the pump to vehicle support structure. The pump has a pump housing with a pump inlet and a pump outlet. An inlet hose is attached to the pump inlet, and an outlet hose is attached to the pump outlet. The apparatus includes a compliant pump hose mount that has a hose attachment portion with a hose opening sized so that one of the inlet hose and the outlet hose is supportable by the pump hose mount at the hose opening. The pump hose mount also has a mount portion mountable to the vehicle support structure. The pump is thereby mounted to the vehicle support structure by the pump hose mount, so that noise and vibration of the pump are mitigated by the pump hose mount. Optionally, one or more rigid inserts can be co-molded in the pump hose mount to provide rigidity of the mount at the fasteners or for the inlet or outlet hose, or to limit compression of the pump hose mount. A bracket may be used to connect the pump hose mount with the vehicle support structure.

The compliant pump hose mount enables dynamic isolation of noise and vibration of the pump with a reduced number of components. A bracket assembly that includes a bracket and compliant member are typically used to directly mount the pump housing to the vehicle support structure at two bracket connector locations is eliminated by use of the compliant pump hose mount. The two vibration paths through the bracket assembly to the vehicle support structure (at the two bracket to vehicle support structure connection points) are also eliminated. Instead, a typical glued-on hose clamp that would be required to locate the hose relative to the pump is replaced with a pump hose mount that has the ability to mount and support the pump as well as either the inlet or the outlet hose. By eliminating the glued-on hose clamp, the inlet hose price may be reduced. Dynamic isolation is improved with fewer attachments to the vehicle as the number of transmission paths is reduced. In one embodiment, the pump hose mount connects to the pump so that the pump is cantilevered at the mount. The vibration dynamics of the cantilevered pump through the pump hose mount are simpler than the vibration dynamics would be through the typical bracket assembly. Testing indicates that the inlet of an electric centrifugal coolant pump is the least sensitive area for transmitting pump-generated vibrations. Accordingly, with the compliant pump hose mount located at the inlet hose and surrounding the inlet extension of the pump, less noise and vibration should occur at the pump mount, enabling better tuning of the pump mount, and thereby better vibration mitigation and less transmission to the remainder of the vehicle.

Additionally, because pumps for a given vehicle application are generally designed to receive a standard diameter inlet and outlet hose, the pump hose mount can be used with different pump models, potentially decreasing design and development costs and tooling costs. By contrast, the typical pump bracket assembly replaced by the pump hose mount must be specifically designed for each different pump model, as pump housings are not standardized in the same manner as inlet and outlet hoses. Moreover, because the pump hose mount design is not limited to a specific pump or hose assembly, and a pump bracket is not required, the pump can be shipped without a bracket, reducing required shipping volume for the pump which may reduce costs.

The above features and advantages and other features and advantages of the present teachings are readily apparent from the following detailed description of the best modes for carrying out the present teachings when taken in connection with the accompanying drawings.

DETAILED DESCRIPTION

Figure 1:
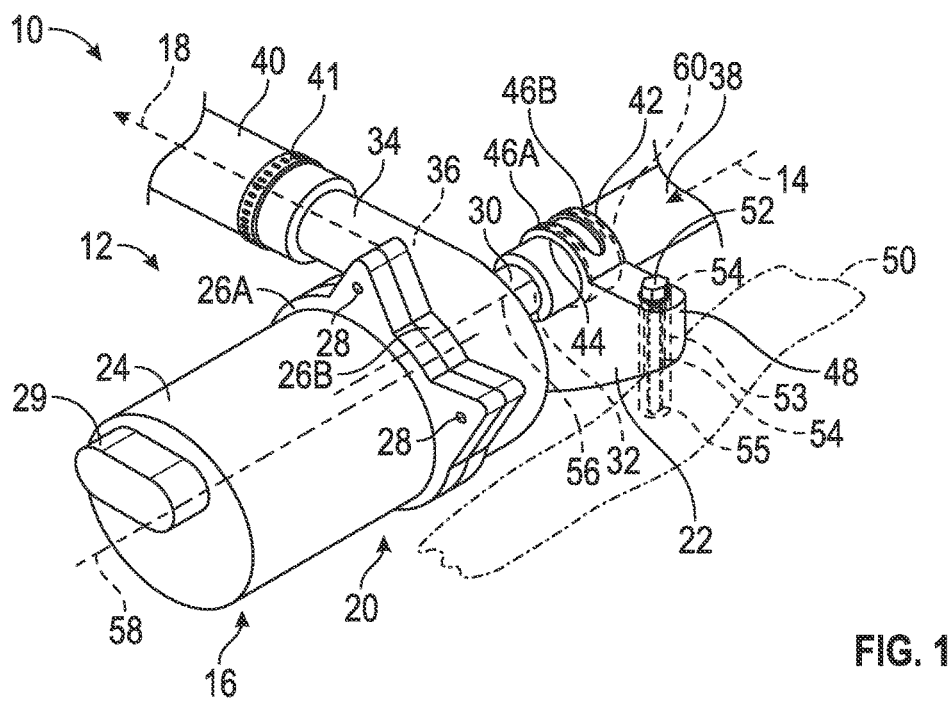
FIG. 1 is a schematic perspective illustration of a first embodiment of a vehicle having an assembly including a pump and a first embodiment of a compliant pump mount for mounting the pump to vehicle support structure.

Referring to the drawings, wherein like reference numbers refer to like components throughout the several views, FIG. 1 shows a vehicle 10 that has a system 12 having fluid, represented by arrow 14 indicating fluid incoming to a pump 16, and arrow 18, indicating fluid outgoing from the pump 16. The system 12 can be a coolant system, such as for a cooling fan radiator module, or any other fluid-based system that utilizes a pump to move the fluid through the system 12. The pump 16 is an electric centrifugal coolant pump, but other pumps are included within the scope of the present teachings. The vehicle 10 can be any type of vehicle, including a hybrid vehicle such as but not limited to a hybrid electric vehicle (HEV), a belt-alternator-starter (BAS) hybrid vehicle, or a plug-in hybrid electric vehicle (PHEV). The pump 16 can be used in many different cooling loops such as but not limited to those used for drive motor cooling, drive motor battery cooling, drive motor battery charger cooling, generator control module cooling, charge air cooler cooling, or for an auxiliary heater.

The pump 16 is included in an assembly 20 that has an apparatus 22, also referred to as a compliant pump hose mount 22. As described herein, the compliant pump hose mount 22 enables dynamic isolation of noise and vibration of the pump 16 with a reduced number of components resulting in, fewer paths having less engineering complexity for transmission of noise and vibration from the pump 16 to vehicle occupants. Moreover, as explained herein, because pumps generally have standard inlet and outlet sizes, the pump hose mount 22 or pump hose mounts described with respect to other embodiments can be a common solution for all pumps used for a given application.

FIG. 1 shows that the pump 16 has a pump housing 24. The pump housing 24 has multiple housing portions 26A, 26B interconnected with one another with fasteners 28. An integral electrical connector portion 29 extends from the pump housing 24. The pump housing 24 has an inlet extension 30 forming a pump inlet 32 and an outlet extension 34 forming a pump outlet 36. An inlet hose 38 is attached to the inlet extension 30 around the pump inlet 32. An outlet hose 40 is attached to the outlet extension 34 around the pump outlet 36 using a hose clamp 41.

The compliant pump hose mount 22 of FIG. 1 is a one-piece, compliant pump hose mount made of rubber or similar compliant material. The compliant pump hose mount 22 has a hose attachment portion 42 with a hose opening 44 sized so that the inlet hose 38 is supportable by the pump hose mount 22 at the hose opening 44. In FIG. 1, the hose attachment portion 42 is generally cylindrical with ring portions 46A, 46B. The inlet hose 38 has an outer diameter that fits securely to the hose attachment portion 42 at an inner diameter of the hose attachment portion 42. A rigid insert 60 is co-molded in the compliant mount 22 at the hose attachment portion 42. The rigid insert 60 may be a metal band with extensions inside of the ring portions 46A, 46B. The rigid insert 60 provides increased stability to prevent movement of the inlet hose 38 and the inlet extension 30 relative to the surrounding hose attachment portion 42.

The compliant pump hose mount 22 also has a mount portion 48 mounted to vehicle support structure 50 by a fastener 52 that extends through a fastener opening 54 through the mount portion 48. The fastener opening 54 extends generally perpendicular to the hose mount opening 44 and inlet hose 38. A rigid insert 53 in the form of a sleeve is co-molded in the compliant mount 22 around the fastener opening 54. The rigid insert 53 can be threaded or otherwise configured to enhance the attachment of the fastener 52 to the vehicle support structure 50. The rigid insert 53 limits compression of the pump hose mount 22 at the hose mount portion 48. A mating opening 55 is provided in the vehicle support structure to receive the fastener 52. The mating opening 55 can also be threaded. Other ways of securing the hose mount portion 48 to the vehicle support structure 50 are also possible, such as by securing the hose mount portion 48 to a bracket that fastens to the vehicle support structure 50.

By use of the one-piece pump hose mount 22, the pump 16 is mounted to and supported by the vehicle support structure only by the single pump hose mount 22. The pump hose mount 22 serves two functions by both securing the inlet hose 38 to the vehicle support structure 50 and supporting the pump 16. Noise and vibration of the pump 16 are mitigated by the pump hose mount 22. A center axis 56 of the inlet extension 30 forming the pump inlet 32 extends parallel to a center axis 58 of the pump 16. The pump 16 is cantilevered at the pump hose mount 22. Stated differently, the pump 16 is supported by the vehicle structural support 50 only via the pump house mount 22 near one end of its axial length, that is, at the inlet extension 30.

The compliant pump hose mount 22 enables dynamic isolation of noise and vibration of the pump 16 with a reduced number of components. The bracket assembly typically used to mount the pump housing is eliminated by use of the pump hose mount 22, as are the two vibration paths through them to the vehicle support structure (at the two bracket to vehicle support structure connection points). Instead, a typical glued-on hose clamp that would be required to locate the hose relative to the pump is replaced with a pump hose mount 22 that has the ability to mount and support the pump 16 as well as the inlet hose 38. By eliminating the glued-on hose clamp, the inlet hose price may be reduced. Dynamic isolation is improved with fewer attachments to the vehicle as transmission paths are reduced. In the embodiment shown, additional vibration transmission paths exist at hose to vehicle support structure connections at opposite ends (not shown) of the inlet hose 38 and outlet hose 40, and at any additional hose clips or mounts, but these paths would exist in prior designs as well, so the overall number of paths is still reduced by eliminating the typical bracket assembly that surrounds the pump housing.

The vibration dynamics of the cantilevered pump 16 through the pump hose mount 22 on the inlet hose 38 are simpler than the vibration dynamics of the pump housing would be through the typical surrounding compliant member and bracket. Testing indicates that the inlet of an electric centrifugal coolant pump is the least sensitive area for transmitting pump-generated vibrations. Accordingly, with the mount 22 located at the inlet hose 38 surrounding the inlet extension 30, less noise and vibration is experienced at the pump mount 22, resulting in the ability to better tune the pump mount 22, better mitigation and less transmission to the remainder of the vehicle 10.

Additionally, because pumps for a given vehicle application are generally designed to receive a standard diameter inlet and outlet hose, the pump hose mount 22 can be used with different pump models, potentially decreasing design and development costs and tooling costs. By contrast, the typical bracket assembly for the pump housing with surrounding compliant member and bracket must be specifically designed for each different pump model, as pump housings are not standardized in the same manner as inlet and outlet hoses. Moreover, because the design is not tied to a specific pump or hose assembly, and a pump bracket is not required, the pump can be shipped without a bracket, reducing required shipping volume for the pump which may reduce costs.

Figure 2:
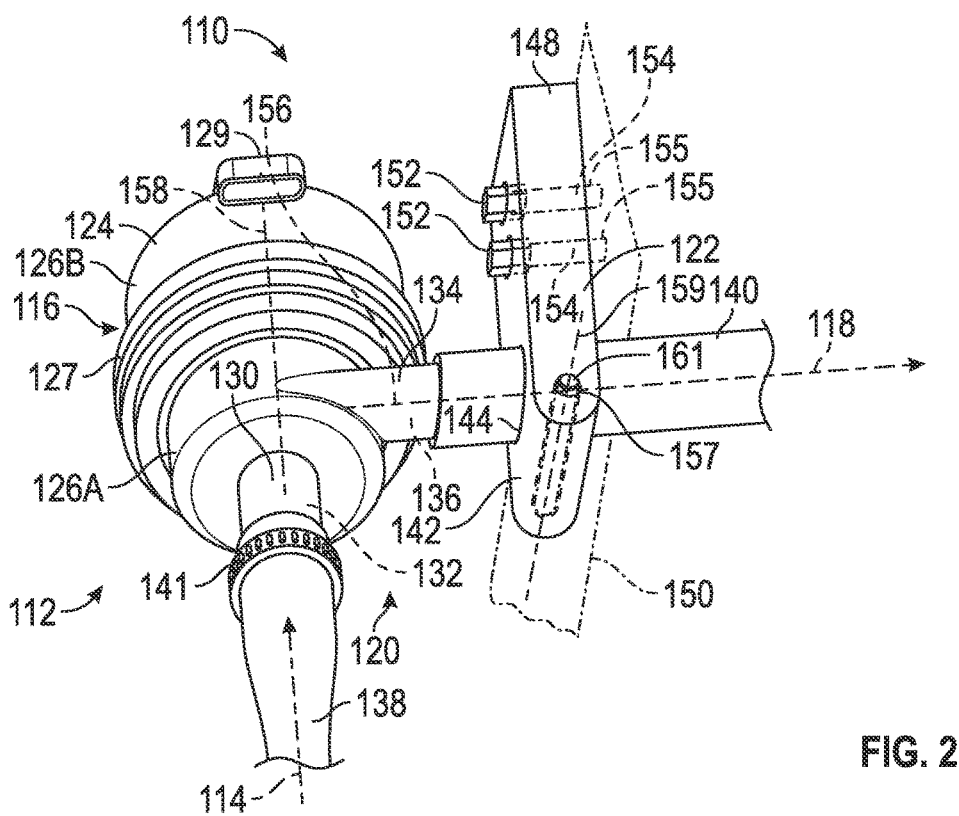
FIG. 2 is a schematic perspective illustration of a second embodiment of a vehicle having an assembly including a pump and a second embodiment of a compliant pump mount for mounting the pump to vehicle support structure in accordance with an alternative aspect of the present teachings.

FIG. 2 shows another embodiment of a vehicle 110 that has a system 112 having fluid, represented by arrow 114 indicating fluid incoming to a pump 116, and arrow 118, indicating fluid outgoing from the pump 116. The system 112 can be a coolant system, such as for a cooling fan radiator module, or any other fluid-based system that utilizes a pump to move the fluid through the system 112. The pump 116 is an electric centrifugal coolant pump, but other pumps are included within the scope of the present teachings.

The pump 116 is included in an assembly 120 that has an apparatus 122, also referred to as a compliant pump hose mount 122. As described herein, the compliant pump hose mount 122 enables dynamic isolation of noise and vibration of the pump 116 with a reduced number of components, and fewer paths having less engineering complexity for transmission of noise and vibration from the pump 116 to vehicle occupants. Moreover, as explained herein, because pumps generally have standard inlet and outlet sizes, the pump hose mount 122 or pump hose mounts described with respect to other embodiments can be a common solution for all pumps for a given application.

FIG. 2 shows that the pump 116 has a pump housing 124. The pump housing 124 has multiple housing portions 126A, 126B interconnected with one another such as with fasteners (not shown) that can extend through a flange 127, or the flange 127 can be configured to clip the housing portions 126A, 126B to one another. An integral electrical connector portion 129 extends from the pump housing 124. The pump housing 124 has an inlet extension 130 forming a pump inlet 132 and an outlet extension 134 forming a pump outlet 136. An inlet hose 138 is attached to the inlet extension 130 around the pump inlet 132 using a hose clamp 141. An outlet hose 140 is attached to the outlet extension 134 around the pump outlet 136.

The compliant pump hose mount 122 of FIG. 2 is a one-piece, compliant pump hose mount made of rubber or similar compliant material. The compliant pump hose mount 122 has a hose attachment portion 142 with a hose opening 144 sized so that the outlet hose 140 is supportable by the hose mount 122 at the hose opening 144. In FIG. 2, the hose attachment portion 142 is generally rectangular, but may be other shapes. The outlet hose 140 has an outer diameter that fits securely to the hose attachment portion 142 at an inner diameter of the hose attachment portion 142 at the hose opening 144.

The hose opening 144 has a first center axis 156. The hose attachment portion 142 has an aperture 157 adjacent the hose opening 144. The aperture 157 has a second center axis 159 generally perpendicular to the first center axis 156. A pin clamp 161 extends through the aperture 157 to compress the pump hose mount 122 around the hose opening 144.

The compliant pump hose mount 122 also has a mount portion 148 mounted to vehicle support structure 150 by fasteners 152 that extend through fastener openings 154 through the mount portion 148. The fastener openings 154 extend generally perpendicular to the hose mount opening 144 and outlet hose 140. Rigid sleeve inserts can be co-molded in the compliant mount 122 around the fastener openings 154 similar to insert 54 of FIG. 1. Mating openings 155 are provided in the vehicle support structure 150 to receive the fasteners 152. The mating openings 155 can also be threaded. Other ways of securing the hose mount portion 148 to the vehicle support structure 150 are also possible, such as by securing the hose mount portion 148 to a bracket that fastens to the vehicle support structure 150.

By use of the one-piece pump hose mount 122, the pump 116 is mounted to and supported by the vehicle support structure only by the single pump hose mount 122. The pump hose mount 122 serves to both secure the outlet hose 140 to the vehicle support structure 150, and supporting the pump 116. Noise and vibration of the pump 116 are mitigated by the pump hose mount 122. The center axis 156 of the hose opening 144 is also the center axis of the outlet extension 134, and extends perpendicular to a center axis 158 of the pump 116. The pump 116 is cantilevered at the pump hose mount 122. Stated differently, the pump 116 is supported by the vehicle structural support 150 only via the pump house mount 122 near one end of its width, that is, at the outlet extension 134. Mounting the pump 116 to the vehicle support structure 150 using only the hose pump mount 122 enables many of the same benefits described with respect to the hose pump mount 22 of FIG. 1.

Figure 3:
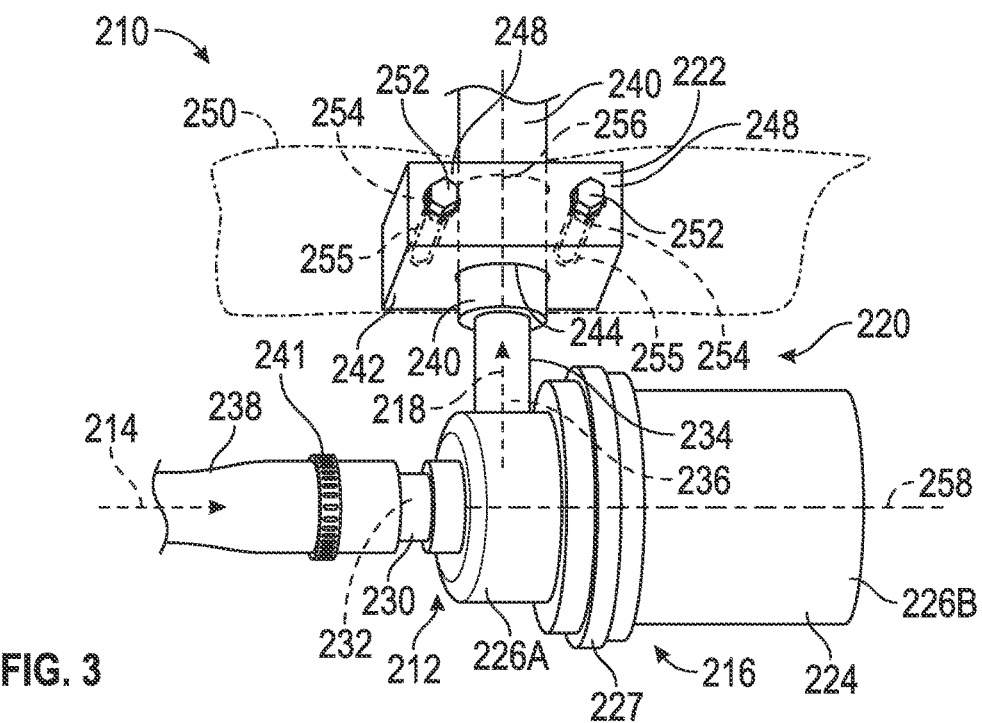
FIG. 3 is a schematic perspective illustration of a third embodiment of a vehicle having an assembly including a pump and a third embodiment of a compliant pump mount for mounting the pump to vehicle support structure in accordance with an alternative aspect of the present teachings.

FIG. 3 shows another embodiment of a vehicle 210 that has a system 212 having fluid, represented by arrow 214 indicating fluid incoming to a pump 216, and arrow 218, indicating fluid outgoing from the pump 216. The system 212 can be a coolant system, such as for a cooling fan radiator module, or any other fluid-based system that utilizes a pump to move the fluid through the system 212. The pump 216 is an electric centrifugal coolant pump, but other pumps are included within the scope of the present teachings.

The pump 216 is included in an assembly 220 that has an apparatus 222, also referred to as a compliant pump hose mount 222. As described herein, the compliant pump hose mount 222 enables dynamic isolation of noise and vibration of the pump 216 with a reduced number of components and fewer paths having less engineering complexity for transmission of noise and vibration from the pump 216 to vehicle occupants. Moreover, as explained herein, because pumps generally have standard inlet and outlet sizes, the pump hose mount 222 or pump hose mounts described with respect to other embodiments can be a common solution for all pumps for a given application.

FIG. 3 shows that the pump 216 has a pump housing 224. The pump housing 224 has multiple housing portions 226A, 226B interconnected with one another such as with fasteners (not shown) that can extend through a flange 227, or the flange 227 can be configured to clip the housing portions 226A, 226B to one another. An integral electrical connector portion similar to connector portion 29 of FIG. 1 extends from the pump housing 224 on the opposite side from that visible in FIG. 3. The pump housing 224 has an inlet extension 230 forming a pump inlet 232 and an outlet extension 234 forming a pump outlet 236. An inlet hose 238 is attached to the inlet extension 230 around the pump inlet 232 using a hose clamp 241. An outlet hose 240 is attached to the outlet extension 234 around the pump outlet 236.

The compliant pump hose mount 222 of FIG. 3 is a one-piece, compliant pump hose mount made of rubber or similar compliant material. The compliant pump hose mount 222 has a hose attachment portion 242 with a hose opening 244 sized so that the outlet hose 240 is supportable by the pump hose mount 222 at the hose opening 244. In FIG. 3, the hose attachment portion 242 is generally rectangular and is centered in the pump hose mount 222. The hose attachment portion 242 may have other shapes in other embodiments. The outlet hose 240 has an outer diameter that fits securely to the hose attachment portion 242 at an inner diameter of the hose attachment portion 242 at the hose opening 244.

The compliant pump hose mount 222 also has mount portions 248 on either side of the hose attachment portion 242. The mount portions 248 are mounted to vehicle support structure 250 by fasteners 252 that extend through fastener openings 254 through the mount portions 248. The fastener openings 254 extend generally perpendicular to the hose mount opening 244 and outlet hose 240. Rigid sleeve inserts can be co-molded in the compliant mount 222 around the fastener openings 254 similar to insert 54 of FIG. 1. Mating openings 255 are provided in the vehicle support structure 250 to receive the fasteners 252. The mating openings 255 can also be threaded. Other ways of securing the hose mount portions 248 to the vehicle support structure 250 are also possible, such as by securing the hose mount portions 248 to a bracket that fastens to the vehicle support structure 150.

By use of the one-piece pump hose mount 222, the pump 216 is mounted to and supported by the vehicle support structure only by the single pump hose mount 222. The pump hose mount 222 serves two functions by both securing the outlet hose 240 to the vehicle support structure 250 and supporting the pump 216. Noise and vibration of the pump 216 are mitigated by the pump hose mount 222. A center axis 256 of the hose opening 244 is also the center axis of the outlet extension 234, and extends perpendicular to a center axis 258 of the pump 216. The pump 216 is cantilevered at the pump hose mount 222. Stated differently, the pump 216 is supported by the vehicle structural support 250 only via the pump house mount 222 near one end of its width, that is, at the outlet extension 234. Mounting the pump 216 to the vehicle support structure 250 using only the hose pump mount 222 enables many of the same benefits described with respect to the hose pump mount 22 of FIG. 1.

Figure 4:
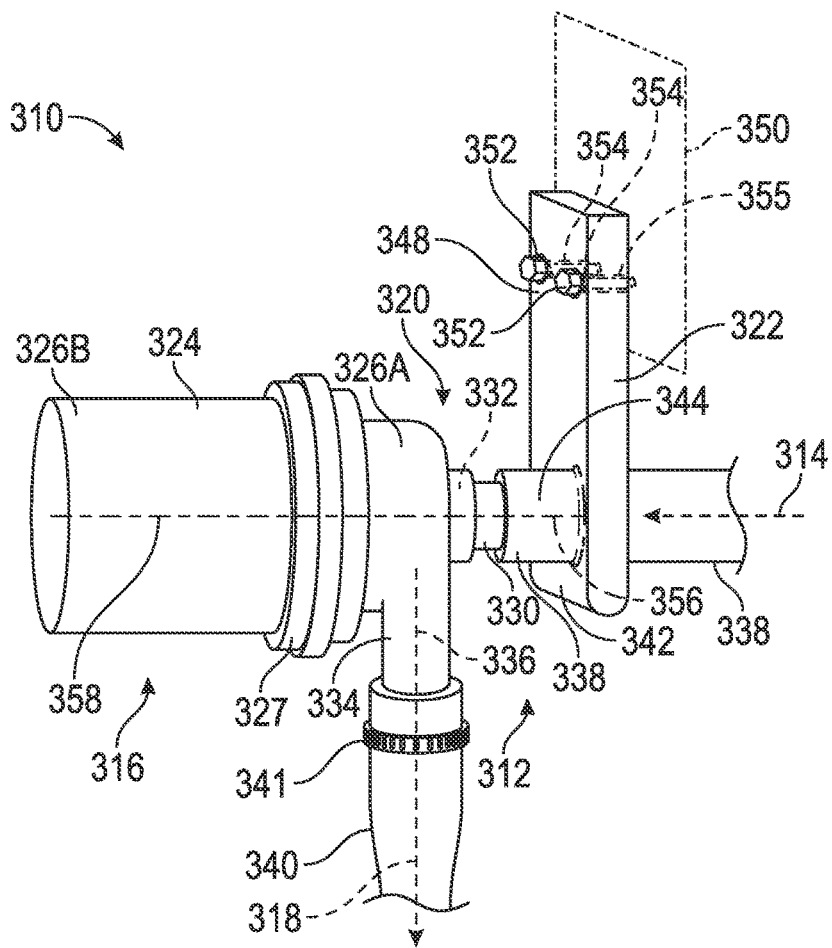
FIG. 4 is a schematic perspective illustration of a fourth embodiment of a vehicle having an assembly including a pump and a fourth embodiment of a compliant pump mount for mounting the pump to vehicle support structure in accordance with an alternative aspect of the present teachings.

FIG. 4 shows another embodiment of a vehicle 310 that has a system 312 having fluid, represented by arrow 314 indicating fluid incoming to a pump 316, and arrow 318, indicating fluid outgoing from the pump 316. The system 312 can be a coolant system, such as for a cooling fan radiator module, or any other fluid-based system that utilizes a pump to move the fluid through the system 312. The pump 316 is an electric centrifugal coolant pump, but other pumps are included within the scope of the present teachings.

The pump 316 is included in an assembly 320 that has an apparatus 322, also referred to as a compliant pump hose mount 322. As described herein, the compliant pump hose mount 322 enables dynamic isolation of noise and vibration of the pump 316 with a reduced number of components and fewer paths having less engineering complexity for transmission of noise and vibration from the pump 316 to vehicle occupants. Moreover, as explained herein, because pumps generally have standard inlet and outlet sizes, the pump hose mount 322 or pump hose mounts described with respect to other embodiments can be a common solution for all pumps for a given application.

FIG. 4 shows that the pump 316 has a pump housing 324. The pump housing 324 has multiple housing portions 326A, 326B interconnected with one another such as with fasteners (not shown) that can extend through a flange 327, or the flange 327 can be configured to clip the housing portions 326A, 326B to one another. An integral electrical connector portion similar to connector portion 29 of FIG. 1 extends from the pump housing 324 on the opposite side from that visible in FIG. 4. The pump housing 324 has an inlet extension 330 forming a pump inlet 332 and an outlet extension 334 forming a pump outlet 336. An inlet hose 338 is attached to the inlet extension 330 around the pump inlet 332 and is integrally formed as part of the one-piece pump hose mount 322. An outlet hose 340 is attached to the outlet extension 334 around the pump outlet 336. using a hose clamp 341.

The compliant pump hose mount 322 of FIG. 4 is thus a one-piece, compliant pump hose mount and inlet hose and is made of rubber or similar compliant material. The compliant pump hose mount 322 has a hose attachment portion 342 with a hose opening 344 formed by the integral inlet hose 338. In FIG. 4, the pump hose mount 322 is generally rectangular, but may be other shapes.

The compliant pump hose mount 322 also has a mount portion 348 mounted to vehicle support structure 350 by fasteners 352 that extend through fastener openings 354 in the mount portion 348. The fastener openings 354 extend generally parallel with the integral inlet hose 338 of the pump hose mount 322. Rigid sleeve inserts can be co-molded in the compliant pump hose mount 322 around the fastener openings 354 similar to insert 54 of FIG. 1. Mating openings 355 (one visible in FIG. 4) are provided in the vehicle support structure 350 to receive the fasteners 352. The mating openings 355 can also be threaded. Other ways of securing the hose mount portions 348 to the vehicle support structure 350 are also possible, such as by securing the hose mount portions 348 to a bracket that fastens to the vehicle support structure 350.

By use of the one-piece pump hose mount 322, the pump 316 is mounted to and supported by the vehicle support structure only by the single pump hose mount 322. The pump hose mount 322 serves two functions by both securing the integral inlet hose 338 of the pump hose mount 322 to the vehicle support structure 350 and supporting the pump 316. Noise and vibration of the pump 316 are mitigated by the pump hose mount 322. A center axis 356 of the hose opening 344 is parallel to the center axis 358 of the pump 316. The pump 316 is cantilevered at the pump hose mount 322. Stated differently, the pump 316 is supported by the vehicle structural support 350 only via the pump house mount 322 near one end of its axial length, that is, at the inlet extension 330. Mounting the pump 316 to the vehicle support structure 350 using only the hose pump mount 322 enables many of the same benefits described with respect to the hose pump mount 22 of FIG. 1.

Figure 5:
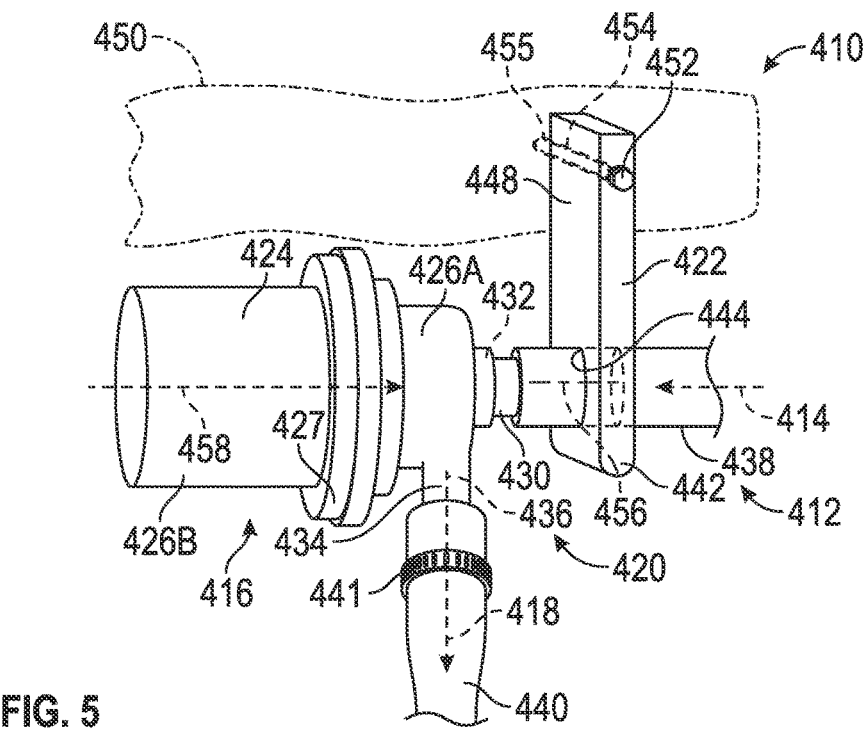
FIG. 5 is a schematic perspective illustration of a fifth embodiment of a vehicle having an assembly including a pump and a fifth embodiment of a compliant pump mount for mounting the pump to vehicle support structure in accordance with an alternative aspect of the present teachings.

FIG. 5 shows another embodiment of a vehicle 410 that has a system 412 having fluid, represented by arrow 414 indicating fluid incoming to a pump 416, and arrow 418, indicating fluid outgoing from the pump 416. The system 412 can be a coolant system, such as for a cooling fan radiator module, or any other fluid-based system that utilizes a pump to move the fluid through the system 412. The pump 416 is an electric centrifugal coolant pump, but other pumps are included within the scope of the present teachings.

The pump 416 is included in an assembly 420 that has an apparatus 422, also referred to as a compliant pump hose mount 422. As described herein, the compliant pump hose mount 422 enables dynamic isolation of noise and vibration of the pump 416 with a reduced number of components and fewer paths having less engineering complexity for transmission of noise and vibration from the pump 416 to vehicle occupants. Moreover, as explained herein, because pumps generally have standard inlet and outlet sizes, the pump hose mount 422 or pump hose mounts described with respect to other embodiments can be a common solution for all pumps for a given application.

FIG. 5 shows that the pump 416 has a pump housing 424. The pump housing 424 has multiple housing portions 426A, 426B interconnected with one another such as with fasteners (not shown) that can extend through a flange 427, or the flange 427 can be configured to clip the housing portions 426A, 426B to one another. An integral electrical connector portion similar to connector portion 29 of FIG. 1 extends from the pump housing 424 on the opposite side from that visible in FIG. 5. The pump housing 424 has an inlet extension 430 forming a pump inlet 432 and an outlet extension 434 forming a pump outlet 436. An inlet hose 438 is attached to the inlet extension 430 around the pump inlet 432. An outlet hose 440 is attached to the outlet extension 434 around the pump outlet 436 using a hose clamp 441.

The compliant pump hose mount 422 of FIG. 5 is a one-piece, compliant pump hose mount made of rubber or similar compliant material. The compliant pump hose mount 422 has a hose attachment portion 442 with a hose opening 444 sized so that the inlet hose 438 is supportable by the pump hose mount 422 at the hose opening 444. The inlet hose 438 has an outer diameter that fits securely to the hose attachment portion 442 at an inner diameter of the hose attachment portion 442 at the hose opening 444.

The compliant pump hose mount 422 also has a mount portion 448 mounted to vehicle support structure 450 by a fastener 452 that extends through a fastener opening 454 through the mount portion 448. The fastener opening 454 extends generally perpendicular to the inlet hose 438 and the hose mount opening 444. Rigid sleeve inserts can be co-molded in the compliant mount 422 around the fastener opening 454 similar to insert 54 of FIG. 1. A mating opening 455 is provided in the vehicle support structure 450 to receive the fastener 452. The mating openings 455 can also be threaded. Other ways of securing the hose mount portion 448 to the vehicle support structure 450 are also possible, such as by securing the hose mount portion 448 to a bracket that fastens to the vehicle support structure 450.

By use of the one-piece pump hose mount 422, the pump 416 is mounted to and supported by the vehicle support structure only by the single pump hose mount 422. The pump hose mount 422 serves two functions by both securing the inlet hose 438 to the vehicle support structure 450 and supporting the pump 416. Noise and vibration of the pump 416 are mitigated by the pump hose mount 422. A center axis 456 of the hose opening 344 is parallel to the center axis 458 of the pump 416. The pump 416 is cantilevered at the pump hose mount 422. Stated differently, the pump 416 is supported by the vehicle structural support 450 only via the pump house mount 422 near one end of its axial length, that is, at the inlet extension 430. Mounting the pump 416 to the vehicle support structure 450 using only the hose pump mount 422 enables many of the same benefits described with respect to the hose pump mount 22 of FIG. 1.

Figure 6:
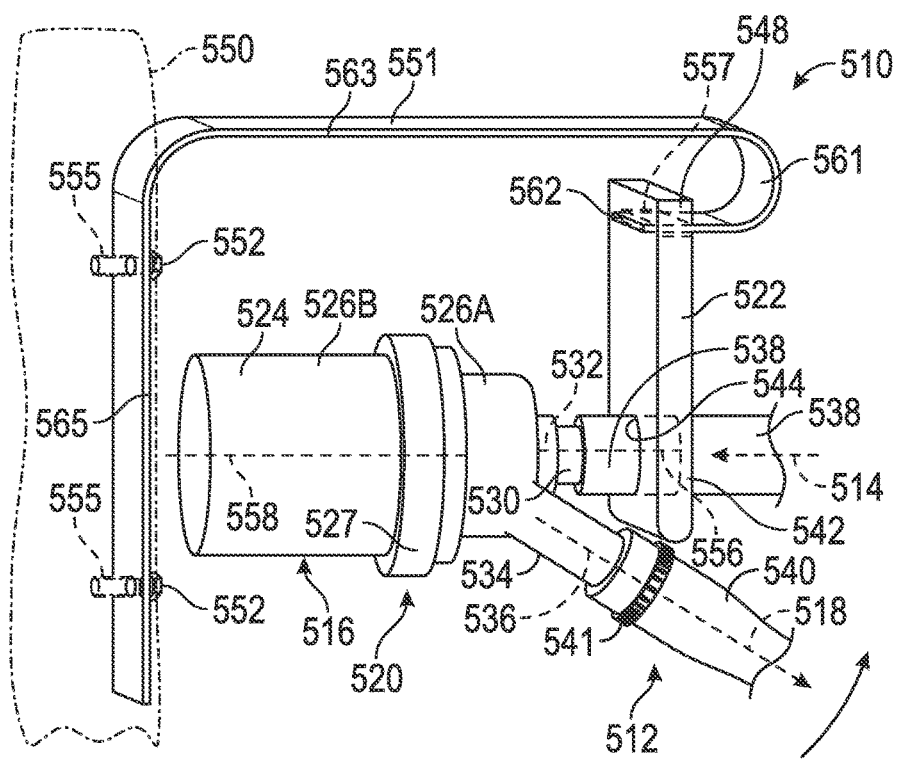
FIG. 6 is a schematic perspective illustration of a sixth embodiment of a vehicle having an assembly including a pump and a sixth embodiment of a compliant pump mount for mounting the pump to vehicle support structure in accordance with an alternative aspect of the present teachings.

FIG. 6 shows another embodiment of a vehicle 510 that has a system 512 having fluid, represented by arrow 514 indicating fluid incoming to a pump 516, and arrow 518, indicating fluid outgoing from the pump 516. The system 512 can be a coolant system, such as for a cooling fan radiator module, or any other fluid-based system that utilizes a pump to move the fluid through the system 512. The pump 516 is an electric centrifugal coolant pump, but other pumps are included within the scope of the present teachings.

The pump 516 is included in an assembly 520 that has an apparatus 522, also referred to as a compliant pump hose mount 522. As described herein, the compliant pump hose mount 522 enables dynamic isolation of noise and vibration of the pump 516 with a reduced number of components and fewer paths having less engineering complexity for transmission of noise and vibration from the pump 516 to vehicle occupants. Moreover, as explained herein, because pumps generally have standard inlet and outlet sizes, the pump hose mount 522 or pump hose mounts described with respect to other embodiments can be a common solution for all pumps for a given application.

FIG. 6 shows that the pump 516 has a pump housing 524. The pump housing 524 has multiple housing portions 526A, 526B interconnected with one another such as with fasteners (not shown) that can extend through a flange 527, or the flange 527 can be configured to clip the housing portions 526A, 526B to one another. An integral electrical connector portion similar to connector portion 29 of FIG. 1 extends from the pump housing 524 on the opposite side from that visible in FIG. 6. The pump housing 524 has an inlet extension 530 forming a pump inlet 532 and an outlet extension 534 forming a pump outlet 536. An inlet hose 538 is attached to the inlet extension 530 around the pump inlet 532. An outlet hose 540 is attached to the outlet extension 534 around the pump outlet 536 using a hose clamp 541.

The compliant pump hose mount 522 of FIG. 6 is a one-piece, compliant pump hose mount made of rubber or similar compliant material. The compliant pump hose mount 522 has a hose attachment portion 542 with a hose opening 544 sized so that the inlet hose 538 is supportable by the pump hose mount 522 at the hose opening 544. The inlet hose 538 has an outer diameter that fits securely to the hose attachment portion 542 at an inner diameter of the hose attachment portion 542 at the hose opening 544.

The compliant pump hose mount 522 also has a mount portion 548 mounted to vehicle support structure 550 by bracket 551 and fasteners 552. The bracket 551 extends through a slot 557 through the mount portion 548. The slot 557 extends generally parallel to the inlet hose 538 and the hose mount opening 544. A rigid sleeve insert can be co-molded in the compliant mount 522 around the slot 557 similar to insert 54 of FIG. 1. The bracket 551 has an arcuate portion 561, an end portion 562 received in the slot 557, an arm portion 563 and a mount portion 565. The nonlinear shape of the bracket 551 allows the assembly 520 to be mounted to the vehicle support structure 550 with the pump 516 between the compliant pump mount 522 and the vehicle support structure 550, and the compliant pump mount 522 secured to the inlet hose 538. Mating openings 555 are provided in the vehicle support structure 550 to receive the fasteners 552. The mating openings 555 can also be threaded. Other ways of securing the hose mount portion 548 to the vehicle support structure 550 are also possible, such as by securing the hose mount portion 548 directly to the vehicle support structure 550, or by using a differently shaped bracket.

By use of the one-piece pump hose mount 522, the pump 516 is mounted to and supported by the vehicle support structure 550 only by the single pump hose mount 522. The pump hose mount 522 serves two functions by both securing the inlet hose 538 to the vehicle support structure 550 and supporting the pump 516. Noise and vibration of the pump 516 are mitigated by the pump hose mount 522. A center axis 556 of the hose opening 544 is parallel to the center axis 558 of the pump 516. The pump 516 is cantilevered at the pump hose mount 522. Stated differently, the pump 516 is supported by the vehicle structural support 550 only via the pump house mount 522 near one end of its axial length, that is, at the inlet extension 530. Mounting the pump 516 to the vehicle support structure 550 using only the hose pump mount 522 enables many of the same benefits described with respect to the hose pump mount 22 of FIG. 1.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An assembly for a vehicle having vehicle support structure, the assembly comprising:
   a pump having a pump housing with a pump inlet and a pump outlet;
   an inlet hose fit to the pump housing at the pump inlet;
   an outlet hose fit to the pump housing at the pump outlet;
   a compliant pump hose mount attached to one of the inlet hose and the outlet hose and attachable to the vehicle support structure so that the pump is supportable by the vehicle support structure only via the compliant pump hose mount; wherein the compliant pump hose mount mitigates noise and vibration of the pump; and
   wherein the compliant pump hose mount has a compliant mount portion that has a fastener opening configured to receive a fastener for attaching the compliant pump hose mount to the vehicle support structure, and further comprising:
   a rigid insert within the compliant pump house mount substantially surrounding the fastener opening so that compression of the compliant pump hose mount is limited by the rigid insert.

2. An assembly for a vehicle having vehicle support structure, the assembly comprising:
   a pump having a pump housing with a pump inlet and a pump outlet;
   an inlet hose fit to the pump housing at the pump inlet;
   an outlet hose fit to the pump housing at the pump outlet;
   a compliant pump hose mount attached to one of the inlet hose and the outlet hose and attachable to the vehicle support structure so that the pump is supportable by the vehicle support structure only via the compliant pump hose mount wherein the compliant pump hose mount mitigates noise and vibration of the pump; and
   wherein the compliant pump hose mount is molded integrally with said one of the inlet hose and the outlet hose.

3. A vehicle comprising:
   a system having fluid and a pump operable to move the fluid;
   vehicle support structure;
   wherein the pump has a pump housing with a pump inlet and a pump outlet;
   an inlet hose fit to the pump housing at the pump inlet;
   an outlet hose fit to the pump housing at the pump outlet;
   a compliant pump hose mount attached to one of the inlet hose and the outlet hose and to the vehicle support structure; wherein the pump is supported by the vehicle support structure only via the compliant pump hose mount; and wherein the compliant pump hose mount mitigates transfer of noise and vibration of the pump to the vehicle support structure;
   wherein the pump outlet extends generally perpendicular to a center axis of the pump; and wherein the compliant pump hose mount is attached to the outlet hose around the pump outlet, the pump thereby being cantilevered at the compliant pump hose mount.

4. The vehicle of claim 3, wherein the compliant pump hose mount is one-piece, having:
   a compliant hose attachment portion with a hose opening sized so that one of the inlet hose and the outlet hose is supported by the compliant pump hose mount at the hose opening; and
   a compliant mount portion mounted to the vehicle support structure.

* * * * *